US006795820B2

(12) United States Patent
Barnett

(10) Patent No.: US 6,795,820 B2
(45) Date of Patent: Sep. 21, 2004

(54) METASEARCH TECHNIQUE THAT RANKS DOCUMENTS OBTAINED FROM MULTIPLE COLLECTIONS

(75) Inventor: Russell Clark Barnett, Provo, UT (US)

(73) Assignee: NextPage, Inc., Draper, UT (US)

( * ) Notice: Subject to any disclaimer, the term of this patent is extended or adjusted under 35 U.S.C. 154(b) by 259 days.

(21) Appl. No.: 09/884,109

(22) Filed: Jun. 20, 2001

(65) Prior Publication Data

US 2002/0198869 A1 Dec. 26, 2002

(51) Int. Cl.$^7$ .............................................. G06F 17/30
(52) U.S. Cl. ........................................................ 707/3
(58) Field of Search ............................................. 707/3

(56) References Cited

U.S. PATENT DOCUMENTS

| | | | | |
|---|---|---|---|---|
| 5,265,244 A | * | 11/1993 | Ghosh et al. ................... | 707/1 |
| 5,642,502 A | * | 6/1997 | Driscoll ......................... | 707/5 |
| 5,806,061 A | * | 9/1998 | Chaudhuri et al. ............ | 707/3 |
| 5,826,261 A | | 10/1998 | Spencer | |
| 6,029,195 A | * | 2/2000 | Herz ........................... | 725/116 |
| 6,070,158 A | * | 5/2000 | Kirsch et al. .................. | 707/3 |
| 6,078,924 A | * | 6/2000 | Ainsbury et al. ........... | 707/101 |
| 6,163,782 A | * | 12/2000 | Singhal .................... | 707/104.1 |
| 6,212,517 B1 | * | 4/2001 | Sato et al. ..................... | 707/5 |
| 6,553,310 B1 | * | 4/2003 | Lopke ........................ | 701/213 |

OTHER PUBLICATIONS

Viles, Charles L. et al, "*Dissemination of Collection Wide Information in a Distributed Information Retrieval System*", Technical Report CS–95–02 (Submitted to SIGIR95), Department of Computer Science, University of Virginia, Charlottesville, VA 22903, Jan. 6, 1995, pp. 1–20.

* cited by examiner

*Primary Examiner*—Wayne Amsbury
(74) *Attorney, Agent, or Firm*—Burns, Doane, Swecker & Mathis, L.L.P.

(57) ABSTRACT

In a metasearch conducted across multiple document collections, a multi-phase approach is employed in which local and global statistics are dynamically exchanged between the search engines and the metasearch engine in response to a user's query. In the first phase, the query is transmitted to the search engines from the metasearch engine, and each search engine computes or retrieves previously-computed local statistics for those terms in its associated document collection. In the second phase, each search engine returns its local statistics. A third phase consists of computing metacollection level statistics at the metasearch engine, based upon the information contained in the local statistics. The metacollection level statistics are disseminated to the search engines. In the final phase, the search engines rank the documents in their respective collections pursuant to the metacollection level statistics, and transmit the rankings to the metasearch engine. The metasearch engine merges the results from the individual search engines, to produce a single ranked results list for the user.

125 Claims, 5 Drawing Sheets

METASEARCH TECHNIQUE THAT RANKS DOCUMENTS OBTAINED FROM MULTIPLE COLLECTIONS

FIELD OF THE INVENTION

The present invention is generally directed to the field of information search and retrieval, and more particularly to techniques for locating and ranking documents and/or other forms of information that are contained in multiple collections accessible via a network.

BACKGROUND OF THE INVENTION

Computer networking technology has made large quantities of digital content available to users, resulting in a phenomenon popularly known as information overload; users have access to much more information and entertainment than they can absorb. Significant practical and commercial value has therefore been provided by search technologies, whose goal is to identify the information that is of greatest utility to a user within a given content collection.

The quality of a search is typically quantified by two measures. First, a search should find all the information in a collection that is relevant to a given query. Second, it should suppress information that is irrelevant to the query. These two measures of success correspond to recall and precision, respectively. A search is considered less effective to the extent that it cannot maximize both measures simultaneously. Thus, while one may be able to increase recall by relaxing parameters of the search, such a result may be achieved only at the expense of precision, in which case the overall effectiveness of the search has not been enhanced.

A metasearch combines results from more than one search, with each search typically being conducted over a different content collection. Often, the various content collections are respectively associated with different information resources, e.g. different file servers or databases, in which case the metasearch is sometimes referred to as a distributed search. The present invention is concerned with the difficulty of maximizing both the recall and precision of a metasearch, particularly one that is conducted via distributed resources. The following discussion explains the sources of such difficulty.

For simplicity of exposition, the issues will be discussed herein with reference to keyword-based queries of text-based content. As practitioners familiar with the field will recognize, the disclosed principles are easily generalized to queries of text-based content that are not purely keyword-based (such as natural-language queries into parsed documents), as well as to queries of content that is not text-based (such as digital sounds and images). The applicability of the present invention to methods for processing such queries will be readily apparent to those skilled in the art.

To facilitate an understanding of the invention, the following definitions are used in the context of exemplary keyword-based searches that are employed to describe the invention. A "term" is defined to be a word or a phrase. A "query" is a set (mathematically, a bag) of terms that describes what is being sought by the user. A "document" is a pre-existing set of terms. A "collection" is a pre-existing set of documents. A "metacollection" is a pre-existing set of collections.

A ranked search is the procedure of issuing a query against a collection and finding the documents that score highest with respect to that query and that collection. The dependence of each score on the entire collection often stems from the well-known technique of weighting most strongly those search terms that are least common in the collection. For example, the query "high-tech farming" would be likely to select the few documents in a computer collection that contain the term "farming", and the few documents in an agriculture collection that contain the term "high-tech".

A metasearch is the procedure of responding to a query against a metacollection by combining results from multiple searches. For the metasearch to be maximally precise, it should find the documents that score highest with respect to the metacollection, not those that score highest with respect to the individual collections in which they reside. For example, in a metasearch over the two aforementioned collections, if a query contains the term "computer," an incorrect implementation would give undue weight to computer-related documents that appear in the agriculture collection. The practical impacts of this effect are substantial to the extent that a metacollection is used to cull information from diverse collections, each with a different specialty or focus.

A process that executes an individual search is called a search engine. A process that invokes search engines and combines results is known as a metasearch engine. FIG. 1 depicts the general components of a metasearch system. Typically, the user presents a query to a metasearch engine 10. The metasearch engine forwards this query on to multiple search engines 12a, 12b . . . 12n, each of which is associated with a collection 14a–14n of information content, e.g. documents 15. Most documents are likely to appear in only one collection. However, some documents can appear in more than one collection, as depicted by the overlap of the sets of documents 15 in collections 14b and 14n. In such a case, multiple references to a document can appear in the results of a metasearch which employs both of these collections. A well-designed metasearch engine attempts to remove duplicates whenever possible.

The relationship between search engines and collections need not be one-to-one. For example, as depicted in FIG. 1, two different search engines 12b and 12c may both execute a query against the same collection 14b. In the context of the present invention, this situation is considered to be within the meaning of executing a query on different collections, namely the collection 14b as processed by the search engine 12b, and the collection 14b as processed by the search engine 12c. In some cases, the two search engines could operate with different sets of heuristics. In such a situation the two search engines might produce different results, e.g., different rankings within the respective documents of the same collection. In the particular situation depicted in FIG. 1, since some documents are common to collections 14b and 14n, three references to those documents could be returned to the metasearch engine by search engines 12b, 12c and 12n, respectively.

The metasearch engine 10 and the various search engines 12 execute on computers that communicate with one another via a network. In a fully distributed metasearch, each engine 10, 12 executes on a different machine. In a less distributed system, two or more of these engines may execute on the same machine. For instance, the search engines 12a and 12b may execute on the same computer 16, or the metasearch engine 10 and one or more of the search engines 12 may execute on the same computer. Similarly, the various collections 14 may reside in different respective storage systems, or any two or more of them can share a common storage facility. The efficiency with which information is exchanged between the metasearch engine 10 and the various search engines 12 via the network is a significant factor in the overall user experience.

In a system that implements metasearch capability, it is desirable to identify the documents that score highest with respect to the metacollection, i.e. the totality of the collections 14a–14n. The more significant components of the system are the search engines, the metasearch engine, and the protocol by which they communicate. When the search engines exist on different machines in a distributed network, it is further desirable for the communication protocol to minimize the amount of latency perceived by the user, as well as the resource burden in terms of bandwidth and processing power.

Numerous metasearch implementations exist in the commercial world and in the academic literature. Because of fundamental differences in approach, these vary significantly in precision. FIG. 2 illustrates a taxonomy of the various implementations for metasearch techniques. Before discussing these implementations, however, one distinctive concept should be noted. Much of the prior art operates by centralized indexing, which is not a form of metasearching. With centralized indexing, the original documents remain in their distributed locations but an index database is stored in a central location. The index is built by "crawling", i.e. copying each document to the centralized facility to be indexed. Unless the copy of a document is required for future retrieval from the central location, it can be destroyed after it has been indexed. Relative to metasearching, central indexing schemes have three main disadvantages. First, because the indexing process takes time, the index is more difficult to keep up to date. For example, crawling the entire Internet takes weeks. Second, unless a protocol is in place specifically to skip the indexing of unchanged documents, the indexing process wastes processing time at the central index and network bandwidth. Third, the hardware resources required to store the central index and to execute queries against it grow at least linearly with the size of the collection being indexed. Thus, metasearch techniques provide significant practical and commercial advantages.

Turning now to FIG. 2, metasearch techniques can be classified into two broad categories, Boolean searches and ranked searches. The weakest metasearch techniques apply Boolean rules that either accept or reject each document, and do not supply a score. Thus, they cannot prioritize results in the event that the result set is too large for the user to consume. In contrast, ranked metasearch techniques permit such prioritization.

The category of ranked metasearches can be further divided into centralized and decentralized ranking. In centralized ranking implementations, each search engine sends candidate documents to the metasearch engine, which then ranks them as a single, new collection. Some variants of centralized ranking transmit each document to the metasearch engine in its entirety. Others make more economical use of network bandwidth by transmitting only the minimal amount of statistical information about each document that is needed to compute the necessary scores. In many cases, a Boolean search initially conducted by each search engine eliminates from consideration any completely irrelevant documents.

Centralized ranking is either network intensive or extremely imprecise. It is network intensive if each search engine returns all documents, or all documents that satisfy the Boolean pass. It is extremely imprecise if a limit is placed on the number of documents returned by each search engine; without performing any scoring or ranking, a search engine cannot prioritize its result list.

To help overcome the extreme imprecision and high bandwidth utilization described above, decentralized ranking techniques are preferred. Decentralized ranking can be carried out by using either local statistics or global statistics. In metasearch implementations that employ local statistics, each search engine initially returns the results that score best with respect to the given query and the individual collection. These results are subsequently combined and manipulated for presentation to the user. Within this rubric there are many subsidiary variations.

a) Some metasearch implementations do not attempt to re-rank results. Instead, they either group results by search server or interleave them.

b) Others attempt to remove duplicates and re-rank results, applying scoring rules with heuristic measures such as the number of duplications across search servers, rank within each search, and concentration of search terms within the title or summary received from each search server.

c) Still others perform a final, centralized ranking at the metasearch engine, treating the union of results returned from the search engines as a single collection.

Regardless of these variations, these implementations suffer from lack of precision when applied across collections with disparate statistics. The scoring function applied within each collection does not in general match the scoring function applied across the metacollection because the local statistics do not match. Thus, in the example described previously, the relatively few documents from the agriculture collection might be ranked higher than the potentially more relevant documents from the computer collection, due to the limited focus of each search engine. Consequently, decentralized ranking with local statistics is most appropriate when the constituent search engines are not under control of the metasearch provider, and each search engine has access to substantially the same content. Those conditions hold true, for example, when combining multiple search engines on the Internet.

To obtain a correct ranking in a network-efficient manner, decentralized ranking with global statistics is most preferable. In this approach, some portion of the computation is executed by the individual search engines using global statistics (statistics that depend on the entire metacollection). The desirability of such metacollection-level statistics has been recognized in the published literature since 1995. See, for example, C. Viles and J. French, "Dissemination of Collection Wide Information in a Distributed Information Retrieval System," Technical Report CS-95-02, University of Virginia, Jan. 6, 1995. Particular methods for accomplishing such computations have been refined during the intervening years.

One class of approaches is to precompute all necessary metacollection-level statistics and store them at each search engine, as taught, for example, in U.S. Pat. No. 6,163,782. This approach eliminates request-response delays perceived by the user that would otherwise be incurred during the computation of metacollection-level statistics. However, it is appropriate only if the same metacollection is used for every metasearch. In general, that condition does not hold. With each query, the user might specify a different set of collections to be included in the metacollection. Even if the user does not make such a specification, many metasearch systems perform a database selection process that determines the collections which are most likely to have appropriate results for a given query. Each query might include conditions, such as access rights, that cause different documents to be included within the metacollection. The set of available documents itself might be dynamic, with documents being continuously added, deleted, and edited. Each of these conditions makes it impractical to use pre-computed metacollection statistics.

In a variation of such an approach, only certain metacollection-level statistics, such as document frequencies, are precomputed and stored at each search engine. Such approaches are subject to similar limitations.

Thus, for correctness and practicality it is preferable for at least some of the metacollection-level statistics to be dynamically computed in response to each query. It is the goal of the present invention to provide such correctness and generality. It is a further goal to do so in a manner that minimizes both perceived latency and consumed memory, processing, and network resources. These goals become increasingly important as the scale of the collections, metacollection, and result sets increases.

SUMMARY OF THE INVENTION

In accordance with the invention, these objectives are achieved by means of a multi-phase approach in which local and global statistics are exchanged between the search engines and the metasearch engine. In the first phase, the query is transmitted to the search engines from the metasearch engine, and each search engine computes or retrieves previously-computed local statistics for those terms in its associated document collection. In the second phase, each search engine returns its local statistics. A third phase consists of computing metacollection level statistics at the metasearch engine, based upon the information contained in the local statistics. The metacollection level statistics are disseminated to the search engines. In the final phase, the search engines determine scores for the documents in their respective collections pursuant to the metacollection level statistics, and transmit document references to the metasearch engine. The metasearch engine merges the results from the individual search engines, to produce a single ranked results list for the user.

By dynamically computing the local and metacollection statistics at the time a query is presented, the present invention maximizes precision for the collections that are being searched, without compromising recall. In addition, the amount of data that is transmitted over the network is kept to a minimum, thereby providing efficient bandwidth utilization and reduced latency. Furthermore, the topology of the search mechanism readily supports a multi-tier hierarchy of search engines, thereby facilitating the scalability of the metasearch system to any number of document collections and search engines.

Additional features of the invention which contribute to both the efficacy of the search and the efficiency of network communications are described hereinafter with reference to exemplary embodiments depicted in the drawings.

DETAILED DESCRIPTION

Figure 1:
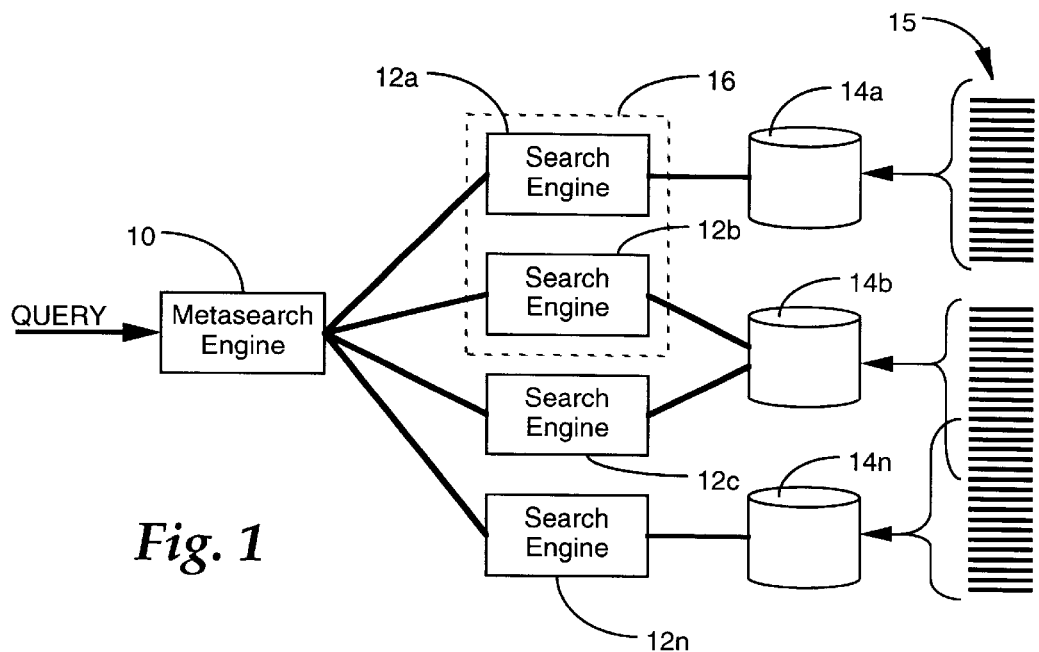
FIG. 1 is a general block diagram of the basic components of a typical metasearch system.
Figure 2:
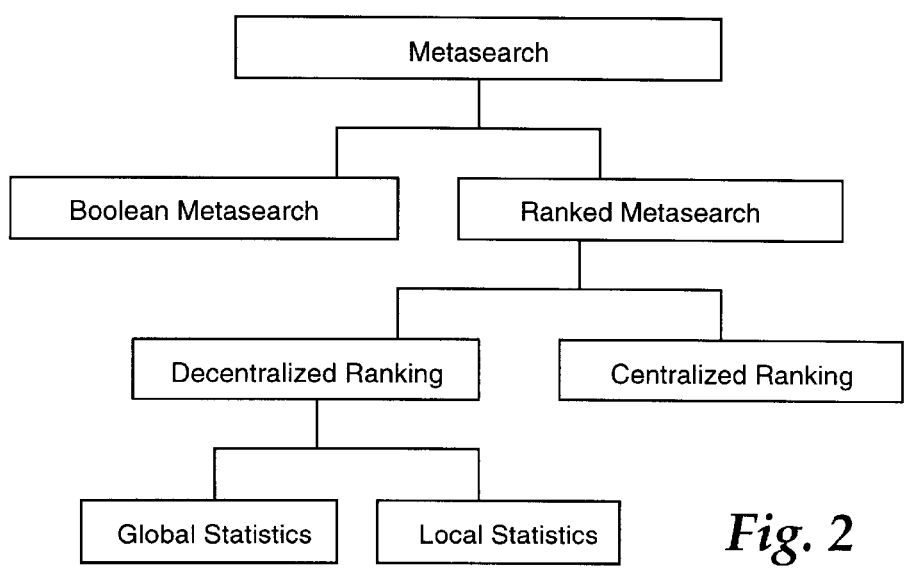
FIG. 2 is an illustration of the topology of various metasearch techniques.

To facilitate an understanding of the invention, a description will first be provided of one example of a methodology that can be employed to score each document that is retrieved in response to a query, for purposes of ranking the relevance of the documents to the terms in the query. In the description which follows, a document can be a file which contains textual terms. Other examples of "documents" that contain searchable content include web pages, images, videos, audio files, etc. In these latter examples, the elements of a query can be any suitable description for the content of the document. For instance, in the case of a video, a query term might be a scene identifier, and in the case of an audio file it might be a particular sequence of musical notes. In a more complex image-retrieval system, the contents of an image might be characterized in terms of wavelet transformations. Information-retrieval techniques, which are well known in the art, call for the scoring of documents based on statistics that are dependent on the query, each document, each collection, and the metacollection.

Collection-level statistics depend only on the query and a single collection. Some commonly employed statistics include:

Collection size ($n_i$): The number of documents or the number of terms in collection i.

Local mean document length ($mdl_i$): The mean document length in collection i.

Local document frequency ($df_{ij}$): The number of documents in collection i that contain term j.

Local collection frequency ($cf_{ij}$): The number of occurrences of the term j in collection i.

Metacollection-level statistics depend on the query and the entire metacollection. These are:

Metacollection size (N): The number of documents or the number of terms in the metacollection.

Mean document length (MDL): The mean document length across the metacollection.

Document frequency ($DF_j$): The number of documents in the metacollection that contain term j.

Inverse document frequency ($IDF_j$): The scarcity of documents containing term j, often equal to $\log(N/DF_j)$.

Collection frequency ($CF_j$): The number of occurrences of the term j in the metacollection.

Inverse collection frequency ($ICF_j$): The scarcity of term j in the metacollection.

Document-level parameters depend on an individual document and the query. These are:

Document length ($dl_k$): The length of document k.

Term frequency ($tf_{jk}$): The number of times term j appears in document k.

Other statistics are known as well, and can be employed in addition to, or in place of, those defined above.

In the so-called vector-space representation, each document is represented as a vector ($r_{1k}, r_{2k}, \ldots$), in which each element ($r_{jk}$) is computed for term j and document k by a function. An example of such a function which is based on some of the foregoing statistics could take the following form:

$$r_{jk} = IDF_j * f(tf_{jk}, dl_k, NP)$$

where f( ) is a function whose precise form varies among implementations, and NP is an optional normalization parameter based on document-level statistics.

As another example, ICF can be used in place of IDF in many cases. It can be seen that the vector representation depends on metacollection-level statistics as well as document-level parameters. Many implementations may also normalize the vector to lie on the unit sphere, i.e., have Euclidean length of one.

The query is similarly represented as a vector, computed as if the query were a document in the metacollection. The score of a document is quantified in terms of its proximity to the query in vector space. Proximity is commonly measured as the cosine of the angle between two vectors, which is efficiently computed as a dot product between the two vectors.

While various metasearch implementations may use different techniques for scoring documents, it is widely acknowledged that dependence of the score on metacollection-level statistics (typically $IDF_j$ or $ICF_j$) produces a practical level of precision in response to a metasearch across multiple collections. The challenges described previously exist in any metasearch wherein document scores depend on metacollection-level statistics.

Figure 3:
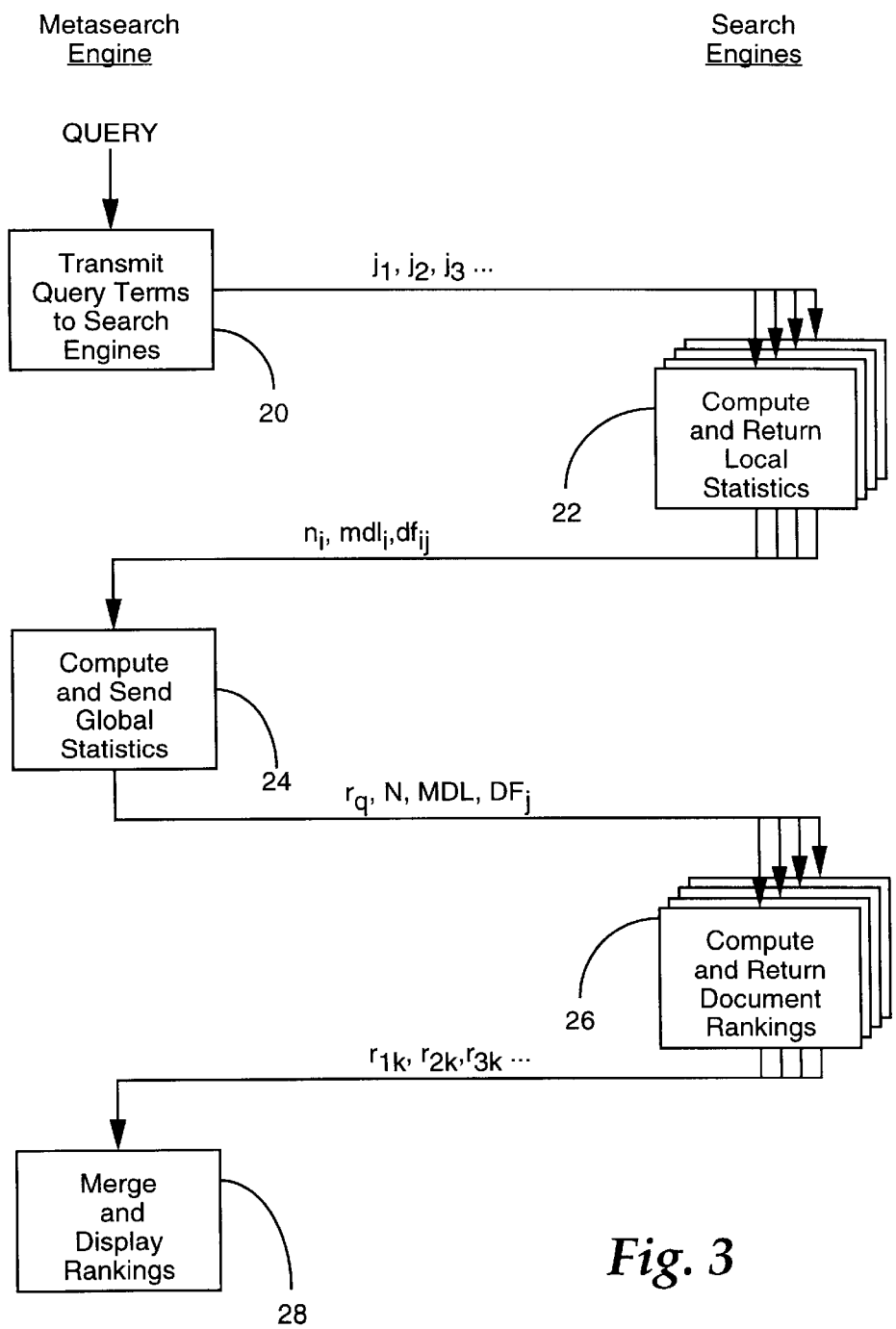
FIG. 3 is a flow diagram of the four fundamental phases of a metasearch in accordance with the present invention.

In accordance with the general principles of the present invention, a metasearch is carried out in four phases, which comprise two cycles of request and response. These four phases are depicted in the flow diagram of FIG. 3. Referring thereto, the metasearch engine 10 first receives a query containing parameters for a ranked search and disseminates it to each search engine 12, at step 20. In response, in the second phase each search engine computes collection-level, or local, statistics at step 22 and returns those statistics to the metasearch engine. In the third phase, the metasearch engine computes and disseminates metacollection-level, or global, statistics (step 24). Finally, in the fourth phase, each search engine scores each document using the global statistics at step 26, and returns a result to the metasearch engine. The metasearch engine collates results from the search engines and produces a single ranking at step 28.

Thus, in the present invention, at least some of the global statistics are computed after receiving the user's query, and are based upon local statistics determined in accordance with the query. In other words, the document scores are dynamically computed, rather than approximated. In some implementations, it may be feasible to calculate some of the global statistics and disseminate them on a periodic basis, rather than compute them for each query. For instance, if all of the documents in a metacollection have lengths that vary within a small range, it may be preferable to compute MDL once per day, and transmit that statistic at a suitable time that would not impact network traffic. For other global statistics, however, particularly IDF and ICF, the best results are obtained when they are computed dynamically for each query.

The data that is returned by the search engine in phase four comprises a document reference. The document reference can take any of a variety of forms. For example, it could be a full copy of the document itself, an identification of the document, a link to the location of the document, e.g. a URL, a link plus a short descriptor or summary of the document, etc. The returned result can also include the relevancy scores for the documents whose references are being supplied to the metasearch engine.

An exemplary embodiment of this technique is presented hereinafter with reference to one example of the typical scoring methodology previously described. In the first phase, the search parameters transmitted at step 20 comprise a set of terms $j_1, j_2, j_3 \ldots$, that appear in the query presented by the user. In the second phase, each search engine returns the collection size $n_i$, the local mean document length $mdl_i$, and, for each term j in the query, the document frequency $df_{ij}$.

In the third phase, the metasearch engine sums the $n_i$ values over i to compute the total collection size N. It computes the mean document MDL as a weighted mean of the local mean document lengths $mdl_i$, e.g., $MDL = [\Sigma (n_i * mdl_i)]/N$. For each term j in the query, it sums the $df_{ij}$ values over i to compute $DF_j$. From these quantities it computes the vector representation of the query, $r_q$. It disseminates the vector query, N, MDL, and every $DF_j$ to each search engine along with the original query. Of particular significance, it is only necessary to disseminate those statistics that are needed for the correct calculation of document scores, namely the statistics for those terms j that appear in the query. Relative to other metasearch techniques that require statistics for every term in the collection, or every term that appears within documents matching the query, the present invention achieves a significant savings in communication overhead.

In the fourth phase, each search engine produces the following parameters for each document k. It computes or fetches a cached value of $dl_k$, and for each term j, the term frequency $tf_{jk}$. From $DF_j$, $tf_{jk}$, $dl_k$, and MDL it computes the vector representation of each document, and hence the score of each document against the query and entire metacollection. The statistics that are disseminated enable the same scoring results to be achieved as those which are attainable through a central indexing approach.

In search engines and metasearch engines, it is often desirable to normalize scores, to remove the effects of false differentiators. In the foregoing example, the mean document length MDL is employed as the normalization parameter NP for the computation of the vector representation. Thus, the scores of the documents are normalized across the collections in accordance with the mean document length MDL for the metacollection. When the scores are not normalized in accordance with document length, the rankings could be biased toward longer documents, if the lengths of the documents vary significantly across the collections. Hence, this normalization can be employed to provide more exact results over the entire metacollection.

Other parameters that are based on document-level statistics can also be employed in lieu of, or in addition to, document length as a normalization parameter. One example is $tf_{max}$, the number of times the most frequent term in the document appears in that document. Another example is the number of unique terms in a document. Other document-level statistics will be apparent as suitable normalization factors as well.

For the ranking computed in phase four to be mathematically correct, IDF is preferably identical at all search engines. One way to accomplish this objective is to compute IDF from DF at the metasearch engine, to thereby guarantee that it will be identical at all of the search engines. However, to provide greater flexibility and provide the ability to accommodate search engines from different vendors, it may be preferable to compute IDF from DF at the individual search engines, rather than at the metasearch engine. In many installations, where metasearch techniques are employed across search engines of diverse origin, the procedures for computing IDF may vary in some details. For most practical purposes, such minor variations are acceptable within the context of the present invention. Furthermore, by computing IDF at the search engine, the conversion of independent variables into dependent variables occurs at a later stage of the process, so that the original data remains intact and available throughout a greater part of the process.

For similar reasons, it may be preferable to calculate other values at the individual search engines, rather than at the metasearch engine. For instance, since the vector representation of the query, $r_q$, is a dependent variable, like IDF, it is a good candidate for such distributed calculation.

In one embodiment of the invention, the query string that is entered by the user can be parsed at the metasearch engine, and each term in the parsed query is transmitted to the search engines during phase one. In a metasearch, however, practical difficulties can arise when different search engines parse the same query string differently. For example, an English language search engine finds word breaks at spaces, whereas a French language search engine is sensitive to contracted articles. Thus, the query "l'enfant" would be parsed by the English language search engine as one word, whereas the French language search engine would parse it as two words. To accommodate for such differences, in the practice of the invention, query parsing is preferably delayed until phase two, and hence occurs at the individual search engines according to their own parsing conventions. In phase three, each search engine returns collection-level statistics together with the parse results in the form of a character offset and length for each term.

In a simple implementation, each distinct combination of character offset and length could be treated as separate terms. Thus, in the preceding example, the term "l'enfant" as identified by the English language search engine would be regarded as distinct from the terms "l'" and "enfant" as identified by the French language search engine. In a more preferred embodiment, the metasearch engine identifies specific matches between differently parsed terms that are co-located in the query string, and aggregates statistics accordingly. For example, the metacollection-level statistics for "enfant" would include the collection-level statistics for "enfant" from the French search engine and those for "l'enfant" from the English one. Similarly, the metacollection-level statistics for "l'enfant" would include collection-level statistics for "l'enfant" from the English search engine and those for "enfant" from the French one, assuming that "enfant" is less common than "l'".

Figure 4:
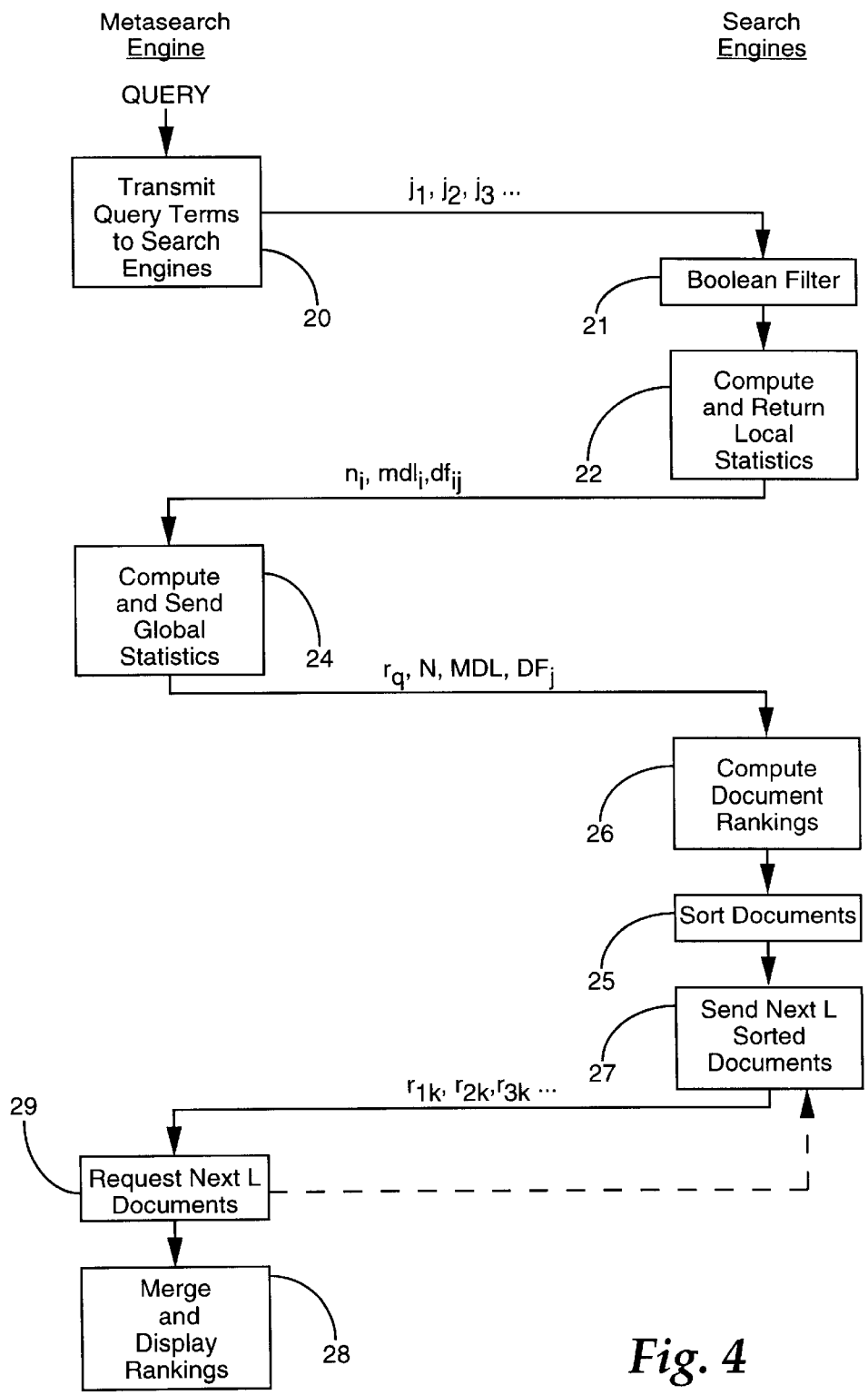
FIG. 4 is a expanded flow diagram of the phases of a metasearch in accordance with the present invention, illustrating additional features that can be incorporated.

The fundamental procedure of the present invention comprises four phases consisting of two request-response pairs. Depending upon the particular implementation, either or both of the request-response pairs might itself comprise plural request-response cycles which are carried out to perform the function of one or more phases of the process, as described hereinafter. In addition, other steps can be included with the fundamental phases to enhance the practicality and value of the metasearch process. Some of these enhancements are set forth below, and depicted in the expanded flow chart of FIG. 4.

As one feature of the invention, phase two may include an additional step 21 of filtering from the collection all documents that do not satisfy a given Boolean condition. The Boolean condition underlying the filter may include arbitrary complex functions that employ non-Boolean operators, as long as the result definitively specifies each document's inclusion or exclusion in the collection to be considered. Examples of such operators include concept matching, usage statistics, database selection, and the like. The Boolean condition can be specified together with the search parameters during phase one, or it may have been established prior to sending the query, in which case it need not be explicitly specified. It may be used to accomplish a variety of practical aims. In the case of a keyword-based query, for example, the Boolean filter can eliminate from consideration any documents with no chance of entering the result set or affecting the collection-level statistics. For example, a Boolean filter can be employed to cull out all documents in a collection that do not contain any of the terms in the query. As another example, the filter might be used to exclude any documents that possess or lack some attribute of exogenous origin, such as having been paid for by the user.

The remaining phases of the process operate on the subset of the collection that survives the Boolean search. Of particular significance is the fact that the Boolean filtering takes place prior to the computation of the statistics that are used to determine relevancy scores for the documents. The collection which remains under consideration after the filtering could generate significantly different local statistics from those which would be generated from the original collection as a whole. For instance, in a search for "water irrigation" a Boolean filter could be used to exclude all documents that do not contain either of the terms "water" or "irrigation". Within the remaining set, it is likely that most of the documents will contain the word "water", since irrigation normally deals with water. As a result, the term "water" will likely have a very low IDF, whereas its IDF in the full collection, or metacollection, could be much larger. Hence, the dynamic computation of the local statistics at the time that a query is received provides more reliable results than pre-query computation of a fixed set of statistics for a collection, particularly when Boolean filtering is used to modify the collection.

In another aspect of the invention, the third phase can include a further step 25 of assigning a key to each document and sorting results within each collection. The sort criterion can be any suitable value-based key, such as the relevancy score itself, or some other attribute such as alphabetically by author name, or temporally by modification date. The metacollection-level sort performed in the fourth phase is then accomplished via a multi-way merge sort that is itself known in the art. Thus, the system performs a distributed sort, avoiding the need to incur the high network costs associated with central ranking.

In a further extension of this feature of the invention, network traffic generated by the merge sort is minimized by "chunking" the result set, i.e., by dividing it into subsets of fixed size L, and passing those subsets only as needed (step 27). Numerous web-based search engines employ a form of chunking at the user-interface level, by displaying results to the user in groups of ten or twenty at a time. The present invention employs chunking at the level of data transfer from each search engine to the metasearch engine in phase four. For example, in response to a user-interface request for the first ten documents, the metasearch engine can request only ten of the sorted document references from each search engine at a time (step 29).

Figure 5:
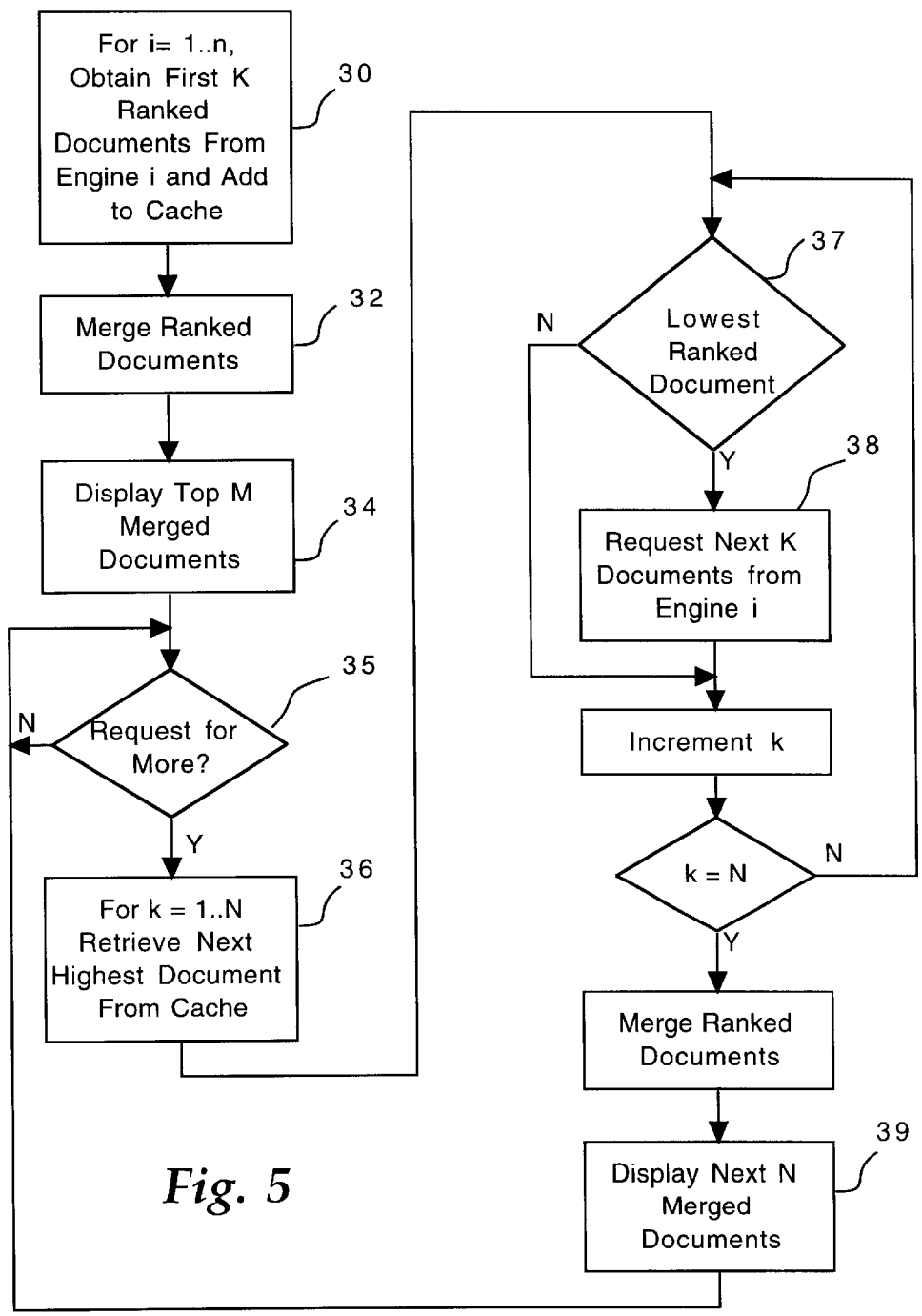
FIG. 5 is a flow chart of the distributed sort and chunking features of an embodiment of the present invention.

This chunking mechanism avoids undue communication between the search engines and the metasearch engine. Referring to FIG. 5, in response to the user's query, the metasearch engine requests the K highest-ranked document references, e.g. the first ten in the sorted order, from each search engine (step 30), and stores the references in a cache memory. The documents from all of the search engines are then merged in sorted order, in accordance with their relevancy rankings (step 32), and the top M merged documents are returned to the requesting entity, e.g. displayed to the user, at step 34. When the user requests the next group of N documents (step 35), the metasearch engine retrieves N documents one by one from its cache (step 36). For each document that is retrieved, the metasearch engine determines if that document is the lowest-ranked document that has been returned by one of the search engines (step 37). If so, the next ranked group of K documents is requested from the corresponding search engine at step 38, and added to the cache. Once all of the necessary documents are stored in the cache, the highest-ranked N document references that have not yet been displayed are presented to the user, at step 39.

As an illustrative example, if K=M=N=5, when the first five document references from each of three search engines are merged and sorted, the documents from Engine A may have rankings of 1, 3, 4, 6 and 8, those of Engine B may be ranked 2, 7, 10, 13 and 15, while those from Engine C are ranked 5, 9, 11, 12 and 14. In response to the initial query, ranked documents 1–5 are displayed to the user. In response to a request for the next five documents, the metasearch engine determines at step 36 that all of the remaining documents from Engine A, namely the documents that are ranked 6 and 8, are needed to fulfill the request. In this case, the metasearch engine requests the next five documents from Engine A, to account for the fact that some or all of these additional documents may have a score which is higher than that of cached document 9 from Engine C and/or document 10 from Engine B. However, no additional documents are requested from Engines B or C, since they each contributed cached documents that are not needed to fulfill the user's current request (ranked documents 11–15). Thus, network traffic is minimized by utilizing the distributed sort technique in combination with the chunking of documents, so that transmissions to the metasearch engine only occur as needed.

In the foregoing example, the number of documents that are presented to the user is equal to the chunk size. However, this need not be the case. Rather, it is possible for the number of documents M that is initially presented to the user to be greater or less than the number of documents K that are sent in each chunk. Similarly, the number of documents N that are displayed to the user in response to a request for additional documents could be different from either of the values for M and K. In such a case, however, the foregoing technique can still be utilized to determine when additional chunks of document references are required from each search engine, and thereby minimize network bandwidth utilization.

To accomplish the merge sort with minimal code complexity and maximum implementation flexibility, in accordance with another variant of the invention the protocol between the metasearch engine and the search engine can employ an abstract iterator together with a value-based sort key. An abstract iterator is well known to software engineers as a uniform interface to a variety of dissimilar data structures such as the array, linked list, and doubly linked list. Such data structures differ in the operations they support. For example, an array supports direct access to the k'th element, whereas the other two do not. An abstract iterator provides the smallest set of common operators, such as "move to first element", "move to next element", and "test for last element". Thus, an abstract iterator permits the implementation of a data structure to be changed without affecting the code that uses the data structure.

Figure 6:
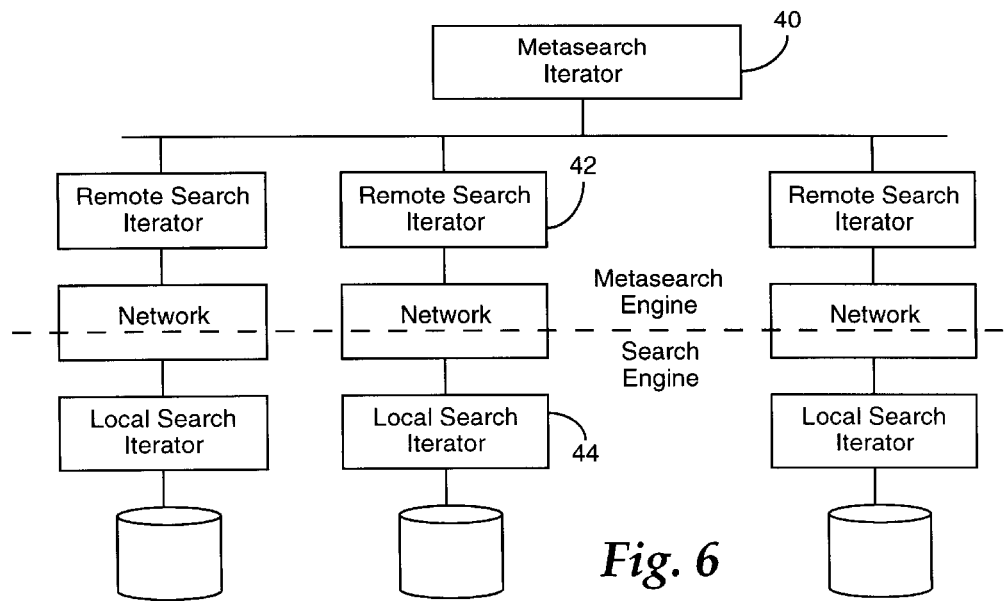
FIG. 6 is a block diagram of the manner in which abstract iterators can be employed in the context of the invention.

Referring to FIG. 6, abstract iterators are employed in the present invention at three locations, and each may be associated with a cache in memory or on disk. The iterators at the three locations respectively comprise a metasearch iterator 40, remote search iterators 42, and local search iterators 44. The two fundamental operators in each such iterator are "initialize" and "return next K elements", where K is a whole number. The behavior of each iterator is defined by its response to these two operators. For clarity of exposition, termination conditions are not described, as they are readily understood by the skilled software engineer.

The metasearch iterator 40 performs the multi-way merge sort. It contains a cache having one memory cell associated with each remote search iterator. Upon initialization, it fills each cell in its cache with the highest ranking document reference from the associated remote search iterator. When requested to return the next element, it returns the highest ranking document reference in its cache and replaces the contents of the vacated cell with the next highest ranking document reference from the associated remote search iterator. When requested to return the next K elements, it returns the next element K times.

The remote search iterator 42 is designed according to a tradeoff between memory consumption at the metasearch engine, the number of request-response cycles invoked between metasearch engine and search engine, and the total network bandwidth consumed. If it contains no cache, it simply passes all requests directly to its associated local search iterator. If it does contain a cache, the cache may be of fixed or unlimited size. Upon initialization, it fills its cache with the highest-ranking document references from its associated local search iterator. When requested to return the next element, it returns the highest ranking document reference in its cache. If the cache is empty, it first fills its cache with the next highest ranking document references from its associated local search iterator. When requested to return the next K elements, it performs the corresponding logic K times, but using only one request via the network.

The local search iterator 44 is designed according to a tradeoff between memory consumption and processing burden at the search engine. If it contains a cache, then the cache may be of fixed or unlimited size. Upon initialization it scores and sorts all documents in the collection, subject to any Boolean filtering; then it fills its cache with the highest ranking document references from its associated collection. When requested to return the next K elements, it serves the responses from its cache. If the cache is exhausted, or if the iterator is designed without a cache, then the local search iterator reinitializes and discards as many of the highest ranking document references as it has already returned.

In a preferred embodiment of the invention, the local search iterator contains a cache of unlimited size. The remote iterator contains a cache of fixed size, which corresponds to the chunk size, i.e., a fixed number of document references fetched upon each request.

The use of value-based sort keys provides further benefits in the context of statelessness. In this further aspect of the invention, each search engine is stateless but cached. From the foregoing description it can be seen that each search engine responds to multiple requests in the course of servicing a single query. In particular, the four fundamental phases of operation are divided into two cycles of response and request, and the second cycle might itself involve multiple request-response cycles if the local sorting and chunking techniques are employed. The response to each request depends on results from previous requests.

Statelessness refers to the capability of the search engine to respond correctly to each request even if it has no memory of previous requests. The benefits of statelessness are known in the field of Internet protocols, for example. They include reduced exposure to memory overflows, resource interchangeability for purposes of scaling and load balancing, and greatly reduced complexity in implementing hierarchical topologies. Caching refers to the use of memory to avoid recomputations whenever memory capacity allows. The present invention accomplishes these goals by means of value-based sort keys in combination with collection-level caches. The cache stores the original query, the list of Boolean results computed in phase one, the metacollection-level statistics disseminated in phase two, and the scores and sort order computed in phase three.

As an illustrative example, the metasearch engine can increment an iterator, resulting in an indication that it requires more results from a particular search engine. Upon detecting this condition, it sends the metacollection-level statistics to that search engine together with the current value-based sort key. If the search engine finds no cache corresponding to the given query, it re-executes the query and sorts the results to refill the cache. It seeks to the correct position in the cache using the value-based sort key and returns the next chunk of results. The term "value-based" implies that the sort key contains only data computed from the query and document, such as its score or a representation of its metadata. Thus, the seek operation works correctly even if documents are added to or removed from the collection.

Figure 7:
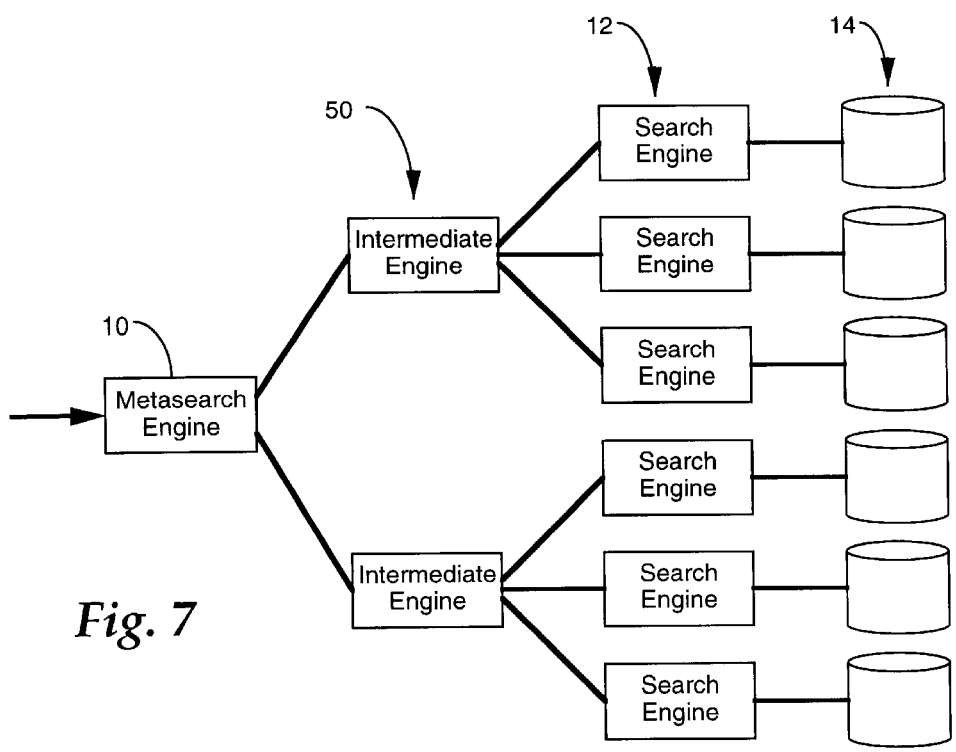
FIG. 7 is a block diagram of a hierarchical arrangement of search engines.

The protocol that is employed in the context of the present invention enables a metasearch engine to be treated as a search engine within a larger metasearch, in accordance with another aspect of the invention. More particularly, the metacollection-level statistics N, MDL, and $DF_j$ that are generated in a smaller metasearch can form intermediate level statistics that are treated as the collection-level statistics $n_i$, $mdl_i$, and $df_{ij}$ in the context of a larger metasearch. In other words, whether a particular search engine is delivering local statistics for a single collection or global statistics for a subsidiary metasearch is inconsequential to the higher-level search engine that is receiving those statistics. By employing this concept in a recursive manner, engines can be arranged in a hierarchy, as illustrated in FIG. 7, so as to permit a query to incorporate the metasearch engine, its neighbors, the neighbors of its neighbors, and so forth.

Referring to the figure, local search engines 12 perform searches on their respective collections 14, and report local statistics $n_i$, $mdl_i$ and $df_i$ to associated intermediate engines 50 during phase two. These intermediate engines process the local statistics in the same manner as the metasearch engine to produce intermediate statistics, e.g. semi-global values. These intermediate statistics are then forwarded to a higher level engine, in this case the metasearch engine 10, which processes them to compute the global statistics. During phase three, these global statistics are transmitted to the intermediate engines 40, which in turn forward them to the local search engines 12. The local search engines utilize the global statistics to score the documents, and report the scores to the intermediate engines 40 during phase four. The intermediate engines merge the scores from their associated search engines, and forward them to the metasearch engine 10, which performs the final merge and display to the user.

This ability to arrange the search engines among multiple tiers is particularly advantageous in the case of geographically distributed collections. When the root node of a hierarchy is separated from a leaf node by multiple network links, the properties of chunked sorting and statelessness become especially valuable in reducing latency, memory overhead, and overall code complexity. More particularly, the ranking of documents and transmission of partial results, utilizing chunking, can be carried out at both the local search engines and the intermediate engines, to thereby minimize network traffic. Each intermediate engine merges the lists of documents that it receives from its associated search engines, and then sends the top-ranked chunks of the merged list to the metasearch engine as necessary.

From the foregoing, therefore, it can be seen that the present invention provides a metasearch technique in which local and global statistics are dynamically computed in response to a received query, through multiple request-response cycles between the metasearch engine and the individual search engines. Through this technique, precision and recall are both maximized, while at the same time minimizing network traffic, and thereby reducing latency. Furthermore, the manner in which local and global statistics are computed and calculated enables the architecture of the metasearch system to be implemented in any desirable number of hierarchical tiers, thereby providing the ability to scale the system to accommodate any number and configuration of document collections.

It will be appreciated by those of ordinary skill in the art that the present invention can be implemented in other forms without departing from spirit or essential characteristics thereof. For instance, the invention is not limited to searching over text documents. The techniques described herein apply to any kind of ranked search that uses ranking criteria that depend on metacollection-level statistics.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for identifying and ranking documents contained in a plurality of document collections that form a metacollection, comprising the steps of:

receiving a query string at a metasearch engine, and transmitting terms in said query to search engines associated with said document collections;

at each search engine, dynamically computing local statistics related to said terms for the documents in a collection with which said search engine is associated, including a score normalization factor that comprises a mean document length for the documents in the collection, in response to receipt of said query, and providing said local statistics to the metasearch engine;

computing at least one global statistic related to the documents in the metacollection, including a score normalization factor that comprises a mean document length for the documents in the metacollection, in response to receipt of said local statistics at the metasearch engine, and transmitting said global statistic to said search engines;

determining relevancy scores for said documents at said search engines in accordance with said global statistic;

normalizing said scores in accordance with said normalization factor for the metacollection; and providing references to documents in said metacollection in accordance said relevancy scores.

2. The method of claim 1 wherein said global statistic is also computed dynamically in response to receipt of said query.

3. The method of claim 1 wherein the relevancy score for a document is based solely upon the terms in said query which appear in the document.

4. The method of claim 1 wherein multiple global statistics are computed at the metasearch engine in response to receipt of said local statistics.

5. The method of claim 4 wherein all global statistics required to determine the relevancy scores are computed at the metasearch engine.

6. The method of claim 4 wherein a further global statistic is computed at the search engines in response to receipt of multiple global statistics from said metasearch engine.

7. The method of claim 4 wherein said local statistics include the size of a collection and a measure of the frequency of a given term within the collection, and wherein said global statistics include a measure of the size of the metacollection and a measure of the frequency of a given term within the metacollection.

8. The method of claim 7 wherein said measure of the size of the collection comprises the number of documents in the collection, said measure of the frequency of a given term within the collection comprises the number of documents in the collection that contain said given term, said measure of the size of the metacollection comprises the number of documents in the metacollection, and said measure of the frequency of a given term within the metacollection comprises the number of documents in the metacollection that contain said given term.

9. The method of claim 7 wherein said measure of the size of the collection comprises the number of terms in the collection, said measure of the frequency of a given term within the collection comprises the number of occurrences in the collection of said given term, said measure of the size of the metacollection comprises the number of terms in the metacollection, and said measure of the frequency of a given term within the metacollection comprises the number of occurrences in the metacollection of said given term.

10. The method of claim 7 wherein another global statistic comprises an inverse frequency factor that is computed from the size of the metacollection and the frequency of a given term within the metacollection.

11. The method of claim 10 wherein said inverse frequency factor is computed at the metasearch engine.

12. The method of claim 10 wherein said inverse frequency factor is computed at each of the search engines.

13. The method of claim 1 including the further step of filtering the documents in a collection in accordance with a Boolean condition, and wherein the step of computing local statistics is conducted on the documents which result from said filtering step.

14. The method of claim 13 wherein the documents in a collection are evaluated in accordance with said Boolean condition in response to receipt of a query.

15. The method of claim 14 wherein the Boolean condition is specified by a user in conjunction with a query.

16. The method of claim 14 wherein the query is generated by a user who has access to only a portion of the documents in a collection, and wherein each document in the collection is evaluated in accordance with said Boolean condition regardless of whether the user has access to the document.

17. The method of claim 1 including the further step at each search engine of sorting references to the documents in a collection into an order determined by one or more criteria, and providing said scores to said metasearch engine in the following steps:
a) transmitting a request from said metasearch engine to said search engines for at least one document reference; and
b) returning from each search engine a reference to at least the highest-ranking document reference in the sorted order within said search engine;

and wherein the step of providing references to documents across said metacollection comprises the following steps:
c) sorting the document references returned from said search engines into a metacollection-level order determined by said criteria; and
d) providing to a requestor a reference to at least the highest-ranking document in the metacollection-level order.

18. The method of claim 17, further including the steps of:
e) identifying the search engine that provided said highest-ranking document reference in step (d);
f) sending a request from said metasearch engine to the search engine identified in step (e) for at least one additional document reference;
g) merging the document returned in response to step (f) into said metacollection-level sorted order; and
h) providing to a requestor at least the next-highest-ranking document in the metacollection-level order after the document reference provided in step (d).

19. The method of claim 17 wherein step (b) comprises returning from said search engine to said metasearch engine a reference to each of the at least two highest-ranking documents in the sorted order within said search engine and storing said references in memory at the metasearch engine; and further including the step of providing to a requestor the next-highest-ranking document in the metacollection-level order after the document reference provided in step (d) from said memory at the metasearch engine.

20. The method of claim 17, wherein the document references returned at step (b) are stored in memory at the metasearch engine; and further including the following steps, for each said search engine:
e) determining whether said memory contains at least the next-highest-ranking document in said search engine's sorted order;
f) if said determination is negative, sending a request from said metasearch engine to said search engine for at least the next-highest-ranking document in the search engine's sorted order; and
g) providing to a requestor at least the next-highest-ranking document in the metacollection-level order after the document reference provided in step (d).

21. The method of claim 17, further including the steps of:
e) sending a request from said metasearch engine to at least one of said search engines for at least one additional document reference;
f) repeating at said search engine said step of determining relevancy scores for at least those documents not yet returned by the search engine to the metasearch engine; and
g) sending at least one additional document reference from said search engine to said metasearch engine in response to said request.

22. The method of claim 17, wherein said step of determining relevancy scores includes the step of storing in memory at each said search engine at least one of said relevancy scores, and further including the steps of:
e) sending a request from said metasearch engine to at least one of said search engines for at least one additional document reference;
f) at said search engine, determining whether said memory contains sufficient information to respond to said request;
g) repeating said step of determining relevancy scores at said search engine; and h) sending at least one additional document reference from said search engine to said metasearch engine in response to said request.

23. The method of claim 17 wherein each document reference comprises a copy of the associated document.

24. The method of claim 17 wherein each document reference comprises a link to the location of the associated document.

25. The method of claim 24 wherein said document reference further includes a description of the document.

26. The method of claim 17 wherein each document reference comprises an identification of the associated document.

27. The method of claim 17 wherein said criteria include said relevancy scores.

28. The method of claim 17 wherein said criteria include an alphabetical ordering.

29. The method of claim 17 wherein said criteria include a date associated with each document.

30. The method of claim 1 including the further step of sorting references to the documents in a collection into an order determined by at least one sort criterion, and providing said scores to said metasearch engine according to the following steps:

receiving a request at said metasearch engine for M document references;

sending a request from said metasearch engine to each of said search engines for K document references;

returning from each said search engine to said metasearch engine a reference to each of the K highest ranking document references in the sorted order within said search engine;

sorting the document references returned from said search engines into a metacollection-level order determined by said criteria and storing said references in memory at the metasearch engine;

providing to a requestor a reference to at least the highest-ranking document in the sorted order within said metasearch engine;

receiving at the metasearch engine a subsequent request for N document references;

determining, for each search engine, whether references to the documents at said search engine with ranks M+1 through M+N within the metacollection-level order are present in said memory;

sending a request for K additional document references from said metasearch engine to each of said search engines for which said determining step is negative;

returning from each said search engine a reference to each of the K next-highest-ranking document references in the sorted order within said search engine;

storing said references in memory at the metasearch engine; and providing to a requestor a reference to at least the next-highest-ranking document in the metacollection-level order within said metasearch engine that was not provided previously.

31. The method of claim 1 wherein said step of transmitting terms comprises parsing the query string at the metasearch engine and transmitting each resulting term to said search engines.

32. The method of claim 1 wherein said step of transmitting terms comprises transmitting the entire query string to said search engines, and said step of computing local statistics includes parsing the query string at each search engine.

33. The method of claim 32 wherein said step of providing said local statistics to the metasearch engine includes providing a character offset and length for each term within the query string, and said step of computing global statistics includes computing a match between differently parsed terms that are co-located within the query string and subsequently combining global statistics in accordance with said match.

34. The method of claim 33 wherein said step of computing a match comprises identifying terms that completely enclose one another within said query string.

35. A method for identifying and ranking documents contained in a plurality of document collections that form a metacollection, comprising the steps of:

receiving a query string at a metasearch engine, and transmitting terms in said query to search engines associated with said document collections;

at each search engine, dynamically computing local statistics related to said terms for the documents in a collection with which said search engine is associated, including a score normalization factor for the collection, in response to receipt of said query, and providing said local statistics to the metasearch engine, wherein said normalization factor for a collection comprises a local mean value for the number of times the most frequent term in a document appears in that document for each of the documents in the collection;

computing at least one global statistic related to the documents in the metacollection, including a score normalization factor for the metacollection, in response to receipt of said local statistics at the metasearch engine, and transmitting said global statistic to said search engines, wherein the normalization factor for the metacollection comprises a mean value for said local mean values across all of the collections in the metacollection;

determining relevancy scores for said documents at said search engines in accordance with said global statistic;

normalizing said scores in accordance with said normalization factor for the metacollection; and providing references to documents in said metacollection in accordance said relevancy scores.

36. A system for identifying and ranking documents contained in a plurality of document collections that form a metacollection, comprising:

a plurality of local search engines, each being associated with at least one of said document collections, for receiving query terms and computing local statistics related to said terms for the documents in a collection with which said search engine is associated;

a plurality of intermediate level search engines, each of which receives said local statistics from a subset of said local search engines, and computes intermediate-level statistics that are based upon the collections of documents associated with the corresponding subset of local search engines; and a metasearch engine that receives the intermediate-level statistics from said plurality of intermediate level search engines and computes global statistics related to the documents in the metacollection, in response to receipt of said intermediate-level statistics at the metasearch engine, and transmits said global statistics to said local search engines;

wherein said local search engines determine relevancy scores for the documents in an associated collection in accordance with said global statistics, and provide said scores to the corresponding intermediate level engine, the intermediate level engines combine the scores from the corresponding subset of local search engines and provide the combined scores to the metasearch engine, and the metasearch engine ranks the documents across said metacollection in accordance with relevancy scores received from said intermediate level engines.

37. The system of claim 36 wherein each local search engine filters the documents in a collection in accordance with a Boolean condition, and the local statistics are computed for the documents which result from said filtering step.

38. The system of claim 36 wherein said local statistics include the size of a collection and a measure of the frequency of a given term within the collection, and wherein said global statistics include a measure of the size of the metacollection and a measure of the frequency of a given term within the metacollection.

39. The system of claim 38 wherein another global statistic comprises an inverse frequency factor that is computed from the size of the metacollection and the frequency of a given term within the metacollection.

40. The system of claim 38 wherein said local statistics include a score normalization factor for a collection, and the global statistic comprises a score normalization factor for the metacollection, and said metasearch engine normalizes said scores in accordance with said normalization factor for the metacollection.

41. The system of claim 36 wherein each local search engine sorts the documents in a collection into an order determined by one or more criteria, and transmits said scores to said intermediate engines in subsets that are determined in accordance with the sorted order of the documents.

42. The system of claim 41 wherein said criteria include said relevancy scores.

43. The system of claim 41 wherein said criteria include an alphabetical ordering.

44. The system of claim 41 wherein said intermediate engines merge and sort the subsets of scores received from their associated local search engines, and transmit a further subset of the sorted scores to the metasearch engine.

45. A method for identifying and ranking documents contained in a plurality of document collections that form a metacollection, comprising the steps of:

receiving query terms at a plurality of local search engines, each being associated with at least one of said document collections, and computing local statistics related to said terms for the documents in a collection with which said search engine is associated;

transmitting local statistics from subsets of said local search engines to respective ones of a plurality of intermediate level search engines, and computing intermediate-level statistics at each of said intermediate level search engines that are based upon the collections of documents associated with a corresponding subset of local search engines;

transmitting the intermediate-level statistics from said plurality of intermediate level search engines to a metasearch engine, computing global statistics related to the documents in the metacollection, in response to receipt of said intermediate-level statistics at the metasearch engine, and transmits said global statistics to said local search engines;

determining relevancy scores for the documents in an associated collection in accordance with said global statistics at each of said local search engines, and providing said scores to the corresponding intermediate level engine;

combining the scores from the corresponding subset of local search engines at the intermediate level engines and providing the combined scores to the metasearch engine; and ranking the documents across said metacollection at the metasearch engine in accordance with relevancy scores received from said intermediate level engines.

46. A system for identifying and ranking documents contained in a plurality of document collections that form a metacollection, comprising:

a plurality of local search engines, each being associated with at least one of said document collections, for receiving query terms and dynamically computing local statistics related to said terms for the documents in a collection with which said search engine is associated in response to receipt of a query, said local statistics including a score normalization factor that comprises a mean document length for the documents in the associated collection; and a metasearch engine which receives said local statistics from said local search engines, and computes global statistics related to the documents in the metacollection, in response to receipt of said local statistics at the metasearch engine, and transmits said global statistics to said local search engines, said global statistics including a score normalization factor that comprises a mean document length for the documents in the metacollection;

wherein said local search engines determine relevancy scores for the documents in an associated collection in accordance with said global statistics, normalize said scores in accordance with said normalization factor for the metacollection, and provide said normalized scores to the metasearch engine, and the metasearch engine ranks the documents across said metacollection in accordance with relevancy scores received from said local search engines.

47. The system of claim 46 wherein the local search engines sort references to the documents in a collection into an order determined by at least one sort criterion, and provide said scores to said metasearch engine according to the following steps:

receiving a request from said metasearch engine for K document references; and returning to said metasearch engine a reference to each of the K highest ranking document references in the sorted order within a local search engine;

and wherein said metasearch engine responds to the returned references as follows:

sorting the document references returned from said local search engines into a metacollection-level order determined by said criteria and storing said references in memory;

providing to a requestor a reference to at least the highest-ranking document in the sorted order within said metasearch engine in response to a request for M document references;

in response to a subsequent request for N document references, determining, for each local search engine, whether references to the documents at said local search engine with ranks M+1 through M+N within the metacollection-level order are present in said memory;

sending a request for K additional document references to each of said local search engines for which said determining step is negative;

receiving from each said local search engine a reference to each of the K next-highest-ranking document references in the sorted order within said local search engine;

storing said references in memory; and providing to a requestor a reference to at least the next-highest-ranking document in the metacollection-level order within said metasearch engine that was not provided previously.

48. The system of claim 46 wherein said metasearch engine parses the query string and transmits each resulting term to said local search engines.

49. The system of claim 46 wherein the entire query string is transmitted to said local search engines, and said local search engines parse the query string.

50. The system of claim 49 wherein said local search engines provide a character offset and length for each term within the query string to the metasearch engine, and said metasearch engine computes a match between differently parsed terms that are co-located within the query string and subsequently combines global statistics in accordance with said match.

51. The system of claim 50 wherein said metasearch engine identifies terms that completely enclose one another within said query string.

52. The system of claim 46 wherein said metasearch engine computes said global statistics dynamically in response to receipt of said query.

53. The system of claim 46 wherein the relevancy scores for documents are based solely upon the terms in said query which appear in the respective documents.

54. The system of claim 46 wherein all global statistics required to determine the relevancy scores are computed at the metasearch engine.

55. The system of claim 46 wherein a further global statistic is computed at the search engines in response to receipt of said global statistics from said metasearch engine.

56. The system of claim 46 wherein said local search engines filter the documents in an associated collection in accordance with a Boolean condition, and wherein the local statistics are computed on the documents which result from said filtering.

57. The system of claim 56 wherein the documents in a collection are evaluated in accordance with said Boolean condition in response to receipt of a query.

58. The system of claim 57 wherein the Boolean condition is specified by a user in conjunction with a query.

59. The system of claim 57 wherein the query is generated by a user who has access to only a portion of the documents in a collection, and wherein each document in the collection is evaluated in accordance with said Boolean condition regardless of whether the user has access to the document.

60. The system of claim 46 wherein said local statistics include the size of a collection and a measure of the frequency of a given term within the collection, and wherein said global statistics include a measure of the size of the metacollection and a measure of the frequency of a given term within the metacollection.

61. The system of claim 60 wherein said measure of the size of the collection comprises the number of documents in the collection, said measure of the frequency of a given term within the collection comprises the number of documents in the collection that contain said given term, said measure of the size of the metacollection comprises the number of documents in the metacollection, and said measure of the frequency of a given term within the metacollection comprises the number of documents in the metacollection that contain said given term.

62. The system of claim 60 wherein said measure of the size of the collection comprises the number of terms in the collection, said measure of the frequency of a given term within the collection comprises the number of occurrences in the collection of said given term, said measure of the size of the metacollection comprises the number of terms in the metacollection, and said measure of the frequency of a given term within the metacollection comprises the number of occurrences in the metacollection of said given term.

63. The system of claim 60 wherein another global statistic comprises an inverse frequency factor that is computed from the size of the metacollection and the frequency of a given term within the metacollection.

64. The system of claim 63 wherein said inverse frequency factor is computed at the metasearch engine.

65. The system of claim 63 wherein said inverse frequency factor is computed at each of the local search engines.

66. The system of claim 46 wherein each local search engine sorts references to the documents in a collection into an order determined by one or more criteria, and provides said scores to said metasearch engine by:

a) receiving a request from said metasearch engine for at least one document reference; and b) returning a reference to at least the highest-ranking document reference in the sorted order within said local search engine;

and wherein said metasearch engine provides references to documents across said metacollection by:

c) sorting the document references returned from said local search engines into a metacollection-level order determined by said criteria; and d) providing to a requestor a reference to at least the highest-ranking document in the metacollection-level order.

67. The system of claim 66, wherein said metasearch engine further operates to:

identify the local search engine that provided said highest-ranking document reference;

send a request from said metasearch engine to identified local search engine for at least one additional document reference;

merge the document returned in response to said request into said metacollection-level sorted order; and provide to a requestor at least the next-highest-ranking document in the metacollection-level order after the previously provided document reference.

68. The method of claim 66 wherein each local search engine returns to said metasearch engine a reference to each of the at least two highest-ranking documents in the sorted order within said search engine; and wherein the metasearch engine stores said references in memory and provides to a requestor the next-highest-ranking document in the metacollection-level order from said memory.

69. The system of claim 66, wherein the document references returned from the local search engines are stored in memory at the metasearch engine; and wherein said metasearch engine performs the following steps, for each local search engine:

determining whether said memory contains at least the next-highest-ranking document in said local search engine's sorted order;

if said determination is negative, sending a request to said local search engine for at least the next-highest-ranking document in the local search engine's sorted order; and providing to a requestor at least the next-highest-ranking document in the metacollection-level order after the previously provided document reference.

70. The system of claim 66, wherein said metasearch engine sends a request to at least one of said local search engines for at least one additional document reference; and in response thereto a local search engine determines relevancy scores for at least those documents not yet returned by the search engine to the metasearch engine, and sends at least one additional document reference to said metasearch engine in response to said request.

71. The method of claim 66, wherein each local search engine stores in memory at least one of said relevancy scores, and wherein said metasearch engine sends a request to at least one of said local search engines for at least one additional document reference; said local search engine determines whether said memory contains sufficient information to respond to said request, and if not, determines relevancy scores and sends at least one additional document reference to said metasearch engine in response to said request.

72. The system of claim 66 wherein each document reference comprises a copy of the associated document.

73. The system of claim 66 wherein each document reference comprises a link to the location of the associated document.

74. The system of claim 73 wherein said document reference further includes a description of the document.

75. The system of claim 66 wherein each document reference comprises an identification of the associated document.

76. The system of claim 66 wherein said criteria include said relevancy scores.

77. The system of claim 66 wherein said criteria include an alphabetical ordering.

78. The system of claim 66 wherein said criteria include a date associated with each document.

79. A system for identifying and ranking documents contained in a plurality of document collections that form a metacollection, comprising:
associated in response to receipt of a query, said local statistics including a score normalization factor for a collection that comprises a local mean value for the number of times the most frequent term in a document appears in that document for each of the documents in the collection;
a metasearch engine which receives said local statistics from said local search engines, and computes global statistics related to the documents in the metacollection, in response to receipt of said local statistics at the metasearch engine, and transmits said global statistics to said local search engines, wherein the global statistics include a score normalization factor for the metacollection that comprises a mean value for said local mean values across all of the collections in the metacollection;
wherein said local search engines determine relevancy scores for the documents in an associated collection in accordance with said global statistics, normalize said scores in accordance with said normalization factor for the metacollection and provide said normalized scores to the metasearch engine, and the metasearch engine ranks the documents across said metacollection in accordance with relevancy scores received from said local search engines.

80. A method for identifying and ranking documents contained in a plurality of document collections that form a metacollection, comprising the steps of:
receiving a query string at a metasearch engine, and transmitting terms in said query to search engines associated with said document collections;
at each search engine, computing local statistics related to said terms for the documents in a collection with which said search engine is associated, including a score normalization factor for a collection that comprises a mean document length for the documents in the collection, and providing said local statistics to the metasearch engine;
computing at least one global statistic related to the documents in the metacollection in response to receipt of said local statistics at the metasearch engine, including a score normalization factor for the metacollection that comprises a mean document length for the documents in the metacollection, and transmitting said global statistic to said search engines;
normalizing said scores in accordance with said normalization factor for the metacollection;
determining relevancy scores for said documents at said search engines in accordance with said global statistic; and
providing references to documents in said metacollection in accordance said relevancy scores.

81. A method for identifying and ranking documents contained in a plurality of document collections that form a metacollection, comprising the steps of:
receiving a query string at a metasearch engine, and transmitting terms in said query to search engines associated with said document collections;
at each search engine, computing local statistics related to said terms for the documents in a collection with which said search engine is associated, including a score normalization factor for a collection that comprises a local mean value for the number of times the most frequent term in a document appears in that document for each of the documents in the collection, and providing said local statistics to the metasearch engine;
computing at least one global statistic related to the documents in the metacollection in response to receipt of said local statistics at the metasearch engine, including a score normalization factor for the metacollection that comprises a mean value for said local mean values across all of the collections in the metacollection, and transmitting said global statistic to said search engines;
normalizing said scores in accordance with said normalization factor for the metacollection;
determining relevancy scores for said documents at said search engines in accordance with said global statistic; and
providing references to documents in said metacollection in accordance said relevancy scores.

82. A method for identifying and ranking documents contained in a plurality of document collections that form a metacollection, comprising the steps of:
receiving a query string at a metasearch engine, and transmitting terms in said query to search engines associated with said document collections;
at each search engine, computing local statistics related to said terms for the documents in a collection with which said search engine is associated, including a score normalization factor that comprises a mean document length for the documents in the collection, and providing said local statistics to the metasearch engine;
computing at least one global statistic related to the documents in the metacollection, including a score normalization factor that comprises a mean document length for the documents in the metacollection, in response to receipt of said local statistics at the metasearch engine, and transmitting said global statistic to said search engines;

determining relevancy scores for said documents at said search engines in accordance with said global statistic and sorting references to the documents in a collection into an order determined by at least one sort criterion;

normalizing said scores in accordance with said normalization factor for the metacollection;

receiving a request at said metasearch engine for M document references;

sending a request from said metasearch engine to each of said search engines for K document references;

returning from each said search engine to said metasearch engine a reference to each of the K highest ranking document references in the sorted order within said search engine;

sorting the document references returned from said search engines into a metacollection-level order determined by said criteria and storing said references in memory at the metasearch engine;

providing to a requestor a reference to at least the highest-ranking document in the sorted order within said metasearch engine;

receiving at the metasearch engine a subsequent request for N document references;

determining, for each search engine, whether references to the documents at said search engine with ranks M+1 through M+N within the metacollection-level order are present in said memory;

sending a request for K additional document references from said metasearch engine to each of said search engines for which said determining step is negative;

returning from each said search engine a reference to each of the K next-highest-ranking document references in the sorted order within said search engine;

storing said references in memory at the metasearch engine; and providing to a requestor a reference to at least the next-highest-ranking document in the metacollection-level order within said metasearch engine that was not provided previously.

83. The method of claim 82 wherein said global statistic is computed dynamically in response to receipt of said query.

84. The method of claim 83 wherein said local statistics are also computed dynamically in response to receipt of said query.

85. The method of claim 82 wherein the relevancy score for a document is based solely upon the terms in said query which appear in the document.

86. The method of claim 82 wherein multiple global statistics are computed at the metasearch engine in response to receipt of said local statistics.

87. The method of claim 86 wherein all global statistics required to determine the relevancy scores are computed at the metasearch engine.

88. The method of claim 86 wherein a further global statistic is computed at the search engines in response to receipt of multiple global statistics from said metasearch engine.

89. The method of claim 86 wherein said local statistics include the size of a collection and a measure of the frequency of a given term within the collection, and wherein said global statistics include a measure of the size of the metacollection and a measure of the frequency of a given term within the metacollection.

90. The method of claim 89 wherein said measure of the size of the collection comprises the number of documents in the collection, said measure of the frequency of a given term within the collection comprises the number of documents in the collection that contain said given term, said measure of the size of the metacollection comprises the number of documents in the metacollection, and said measure of the frequency of a given term within the metacollection comprises the number of documents in the metacollection that contain said given term.

91. The method of claim 89 wherein said measure of the size of the collection comprises the number of terms in the collection, said measure of the frequency of a given term within the collection comprises the number of occurrences in the collection of said given term, said measure of the size of the metacollection comprises the number of terms in the metacollection, and said measure of the frequency of a given term within the metacollection comprises the number of occurrences in the metacollection of said given term.

92. The method of claim 89 wherein another global statistic comprises an inverse frequency factor that is computed from the size of the metacollection and the frequency of a given term within the metacollection.

93. The method of claim 92 wherein said inverse frequency factor is computed at the metasearch engine.

94. The method of claim 92 wherein said inverse frequency factor is computed at each of the search engines.

95. The method of claim 82 including the further step of filtering the documents in a collection in accordance with a Boolean condition, and wherein the step of computing local statistics is conducted on the documents which result from said filtering step.

96. The method of claim 95 wherein the documents in a collection are evaluated in accordance with said Boolean condition in response to receipt of a query.

97. The method of claim 96 wherein the Boolean condition is specified by a user in conjunction with a query.

98. The method of claim 96 wherein the query is generated by a user who has access to only a portion of the documents in a collection, and wherein each document in the collection is evaluated in accordance with said Boolean condition regardless of whether the user has access to the document.

99. The method of claim 82 including the further step at each search engine of sorting references to the documents in a collection into an order determined by one or more criteria, and providing said scores to said metasearch engine in the following steps:

a) transmitting a request from said metasearch engine to said search engines for at least one document reference; and b) returning from each search engine a reference to at least the highest-ranking document reference in the sorted order within said search engine;

and wherein the step of providing references to documents across said metacollection comprises the following steps:

c) sorting the document references returned from said search engines into a metacollection-level order determined by said criteria; and d) providing to a requestor a reference to at least the highest-ranking document in the metacollection-level order.

100. The method of claim 99, further including the steps of:
   e) identifying the search engine that provided said highest-ranking document reference in step (d);
   f) sending a request from said metasearch engine to the search engine identified in step (e) for at least one additional document reference;
   g) merging the document returned in response to step (f) into said metacollection-level sorted order; and
   h) providing to a requestor at least the next-highest-ranking document in the metacollection-level order after the document reference provided in step (d).

101. The method of claim 99 wherein step (b) comprises returning from said search engine to said metasearch engine a reference to each of the at least two highest-ranking documents in the sorted order within said search engine and storing said references in memory at the metasearch engine; and further including the step of providing to a requestor the next-highest-ranking document in the metacollection-level order after the document reference provided in step (d) from said memory at the metasearch engine.

102. The method of claim 99, wherein the document references returned at step (b) are stored in memory at the metasearch engine; and further including the following steps, for each said search engine:
   e) determining whether said memory contains at least the next-highest-ranking document in said search engine's sorted order;
   f) if said determination is negative, sending a request from said metasearch engine to said search engine for at least the next-highest-ranking document in the search engine's sorted order; and
   g) providing to a requestor at least the next-highest-ranking document in the metacollection-level order after the document reference provided in step (d).

103. The method of claim 99, further including the steps of:
   e) sending a request from said metasearch engine to at least one of said search engines for at least one additional document reference;
   f) repeating at said search engine said step of determining relevancy scores for at least those documents not yet returned by the search engine to the metasearch engine; and
   g) sending at least one additional document reference from said search engine to said metasearch engine in response to said request.

104. The method of claim 99, wherein said step of determining relevancy scores includes the step of storing in memory at each said search engine at least one of said relevancy scores, and further including the steps of:
   e) sending a request from said metasearch engine to at least one of said search engines for at least one additional document reference;
   f) at said search engine, determining whether said memory contains sufficient information to respond to said request;
   g) repeating said step of determining relevancy scores at said search engine; and
   h) sending at least one additional document reference from said search engine to said metasearch engine in response to said request.

105. The method of claim 99 wherein each document reference comprises a copy of the associated document.

106. The method of claim 99 wherein each document reference comprises a link to the location of the associated document.

107. The method of claim 106 wherein said document reference further includes a description of the document.

108. The method of claim 99 wherein each document reference comprises an identification of the associated document.

109. The method of claim 99 wherein said criteria include said relevancy scores.

110. The method of claim 99 wherein said criteria include an alphabetical ordering.

111. The method of claim 99 wherein said criteria include a date associated with each document.

112. The method of claim 82 wherein said step of transmitting terms comprises parsing the query string at the metasearch engine and transmitting each resulting term to said search engines.

113. The method of claim 82 wherein said step of transmitting terms comprises transmitting the entire query string to said search engines, and said step of computing local statistics includes parsing the query string at each search engine.

114. The method of claim 113 wherein said step of providing said local statistics to the metasearch engine includes providing a character offset and length for each term within the query string, and said step of computing global statistics includes computing a match between differently parsed terms that are co-located within the query string and subsequently combining global statistics in accordance with said match.

115. The method of claim 114 wherein said step of computing a match comprises identifying terms that completely enclose one another within said query string.

116. A method for identifying and ranking documents contained in a plurality of document collections that form a metacollection, comprising the steps of:
   receiving a query string at a metasearch engine, and transmitting terms in said query to search engines associated with said document collections;
   at each search engine, computing local statistics related to said terms for the documents in a collection with which said search engine is associated, and providing said local statistics to the metasearch engine, wherein said local statistics include a score normalization factor for a collection that comprises a local mean value for the number of times the most frequent term in a document appears in that document for each of the documents in the collection;
   computing at least one global statistic related to the documents in the metacollection, in response to receipt of said local statistics at the metasearch engine, and transmitting said global statistic to said search engines, wherein the global statistic includes a score normalization factor for the metacollection that comprises a mean value for said local mean values across all of the collections in the metacollection;
   determining relevancy scores for said documents at said search engines in accordance with said global statistic and sorting references to the documents in a collection into an order determined by at least one sort criterion;
   normalizing said scores in accordance with said normalization factor for the metacollection;
   receiving a request at said metasearch engine for M document references;
   sending a request from said metasearch engine to each of said search engines for K document references;
   returning from each said search engine to said metasearch engine a reference to each of the K highest ranking document references in the sorted order within said search engine;

sorting the document references returned from said search engines into a metacollection-level order determined by said criteria and storing said references in memory at the metasearch engine;

providing to a requestor a reference to at least the highest-ranking document in the sorted order within said metasearch engine;

receiving at the metasearch engine a subsequent request for N document references;

determining, for each search engine, whether references to the documents at said search engine with ranks M+1 through M+N within the metacollection-level order are present in said memory;

sending a request for K additional document references from said metasearch engine to each of said search engines for which said determining step is negative;

returning from each said search engine a reference to each of the K next-highest-ranking document references in the sorted order within said search engine;

storing said references in memory at the metasearch engine; and providing to a requestor a reference to at least the next-highest-ranking document in the metacollection-level order within said metasearch engine that was not provided previously.

117. A system for identifying and ranking documents contained in a plurality of document collections that form a metacollection, comprising:

a plurality of local search engines, each being associated with at least one of said document collections, for receiving query terms and computing local statistics related to said terms for the documents in a collection with which said search engine is associated;

at least one additional search engine which receives said local statistics from a subset of said local search engines, and computes comprehensive statistics that are based upon the collections of documents associated with the corresponding subset of local search engines; and a further search engine that receives the comprehensive statistics from said additional search engine and statistics from at least one other search engine, and computes global statistics for the documents to which the received statistics pertain, and transmits said global statistics to said local search engines;

wherein said local search engines determine relevancy scores for the documents in an associated collection in accordance with said global statistics, and provide said scores to the additional search engine, the additional search engine combines the scores from the corresponding subset of local search engines and provides the combined scores to the further search engine, and the further search engine ranks the documents across said metacollection in accordance with received relevancy scores.

118. The system of claim 117 wherein each local search engine filters the documents in a collection in accordance with a Boolean condition, and the local statistics are computed for the documents which result from said filtering step.

119. The system of claim 117 wherein said local statistics include the size of a collection and a measure of the frequency of a given term within the collection, and wherein said global statistics include a measure of the size of the metacollection and a measure of the frequency of a given term within the metacollection.

120. The system of claim 119 wherein another global statistic comprises an inverse frequency factor that is computed from the size of the metacollection and the frequency of a given term within the metacollection.

121. The system of claim 119 wherein said local statistics include a score normalization factor for a collection, and the global statistic comprises a score normalization factor for the metacollection, and said further search engine normalizes said scores in accordance with said normalization factor for the metacollection.

122. The system of claim 117 wherein each local search engine sorts the documents in a collection into an order determined by one or more criteria, and transmits said scores to said additional search engine in subsets that are determined in accordance with the sorted order of the documents.

123. The system of claim 122 wherein said criteria include said relevancy scores.

124. The system of claim 122 wherein said criteria include an alphabetical ordering.

125. The system of claim 122 wherein said additional search engine merges and sorts the subsets of scores received from said local search engines, and transmits a further subset of the sorted scores to the further search engine.

* * * * *